US012194609B2

(12) United States Patent
Seltmann et al.

(10) Patent No.: US 12,194,609 B2
(45) Date of Patent: Jan. 14, 2025

(54) ENERGY SUPPLY DEVICE FOR A POWER TOOL

(71) Applicant: Hilti Aktiengesellschaft, Schaan (LI)

(72) Inventors: Daniel Seltmann, Landsberg am Lech (DE); Michael Unsöld, Penzing (DE); Andreas Spomer, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 98 days.

(21) Appl. No.: 17/802,266

(22) PCT Filed: Feb. 23, 2021

(86) PCT No.: PCT/EP2021/054402
§ 371 (c)(1),
(2) Date: Aug. 25, 2022

(87) PCT Pub. No.: WO2021/175652
PCT Pub. Date: Sep. 10, 2021

(65) Prior Publication Data

US 2023/0079576 A1 Mar. 16, 2023

(30) Foreign Application Priority Data

Mar. 5, 2020 (EP) .................................... 20161206

(51) Int. Cl.
*B25F 5/02* (2006.01)
*B25D 11/12* (2006.01)
*B25D 17/20* (2006.01)

(52) U.S. Cl.
CPC ................ *B25F 5/02* (2013.01); *B25D 11/12* (2013.01); *B25D 17/20* (2013.01); *B25D 2250/121* (2013.01)

(58) Field of Classification Search
CPC ........................................................ B25F 5/02
See application file for complete search history.

(56) References Cited

U.S. PATENT DOCUMENTS 7,152,328 B2 * 12/2006 Champlin ........... B27B 17/0008 30/296.1
7,743,683 B2 * 6/2010 Dayton ..................... B25F 3/00 173/217

(Continued)

FOREIGN PATENT DOCUMENTS

DE 102015014559 A1 5/2016
DE 102018210189 A1 12/2019

(Continued)

OTHER PUBLICATIONS

International Search Report of PCT/EP2021/054402 dated Apr. 23, 2021.

*Primary Examiner* — Lucas E. A. Palmer
(74) *Attorney, Agent, or Firm* — Davidson Kappel LLC

(57) ABSTRACT

A power tool, in particular a chisel hammer, including a drive, a striking mechanism device, a control device, an energy supply device for supplying the power tool with electrical energy and a power tool housing with a first and second power tool housing area. The energy supply device can be positioned in one direction between the first and second power tool housing areas, a first interface for connecting the energy supply device to the first power tool housing area and a second interface for connecting the energy supply device to the second power tool housing area being provided.

20 Claims, 9 Drawing Sheets

(56) References Cited

U.S. PATENT DOCUMENTS

| | | | | |
|---|---|---|---|---|
| 7,958,642 | B2 * | 6/2011 | Rosskamp | A01G 3/053 30/277.4 |
| 9,357,712 | B2 * | 6/2016 | Pickett | B25G 1/102 |
| 9,591,809 | B2 * | 3/2017 | Gieske | B25G 3/12 |
| 10,675,745 | B2 | 6/2020 | Meixner et al. | |
| 2007/0000138 | A1 * | 1/2007 | Baskar | A01G 3/0417 30/392 |
| 2008/0184568 | A1 * | 8/2008 | Gieske | B27B 17/0008 173/217 |
| 2008/0196256 | A1 * | 8/2008 | Gieske | A01G 3/08 30/296.1 |
| 2013/0255980 | A1 | 10/2013 | Linehan et al. | |
| 2015/0266176 | A1 | 9/2015 | Takeuchi et al. | |
| 2015/0316585 | A1 * | 11/2015 | Forstner | G01R 19/0084 324/126 |
| 2016/0136801 | A1 * | 5/2016 | Furusawa | B25F 5/026 173/162.2 |
| 2017/0326718 | A1 * | 11/2017 | Meixner | B25F 5/008 |
| 2017/0334055 | A1 * | 11/2017 | Meixner | B25D 16/00 |
| 2018/0147713 | A1 * | 5/2018 | Schmauder | B25F 5/02 |
| 2019/0260209 | A1 * | 8/2019 | Nishikawa | H01M 50/247 |
| 2021/0170501 | A1 * | 6/2021 | Barezzani | E01B 31/06 |
| 2022/0123571 | A1 * | 4/2022 | Spencer | B25F 5/00 |
| 2022/0200300 | A1 * | 6/2022 | Krondorfer | H02J 7/0044 |

FOREIGN PATENT DOCUMENTS

| | | | |
|---|---|---|---|
| EP | 2937185 | A1 | 10/2015 |
| EP | 3028823 | A1 | 6/2016 |

* cited by examiner

ENERGY SUPPLY DEVICE FOR A POWER TOOL

The present invention relates to a power tool, in particular a chisel hammer, comprising a drive, a striking mechanism device, a control device, an energy supply device for supplying the power tool with electrical energy and a power tool housing with a first and second power tool housing area.

BACKGROUND

Power tools designed as hammer drills and/or chisel hammers of the type mentioned at the beginning are known in principle from the prior art.

SUMMARY OF THE INVENTION

The handling or operation of large hand-held power tools can turn out to be difficult in certain situations, since these power tools are often heavy and have a balanced mass or weight distribution. Even a slight change in the position of the power tool can therefore lead to an almost uncontrollable destabilization and sudden distraction. As a result, it is also possible that the power tool is dropped by a user and falls onto the ground. Correspondingly, damage to the power tool, and in particular to the components of a power supply for the power tool, is possible. Damage to the power supply can occur especially because the components of the power supply are often located in exposed places on the power tool.

It is an object of the present invention to provide a power tool that allows improved handling and operation and ensures better protection for the power supply of the power tool.

The present invention provides a power tool, in particular a chisel hammer, comprising a drive, a striking mechanism device, a control device, an energy supply device for supplying the power tool with electrical energy and a power tool housing with a first and second power tool housing area.

According to the invention, it is provided that the energy supply device can be positioned in one direction between the first and second power tool housing areas, a first interface for connecting the energy supply device to the first power tool housing area and a second interface for connecting the energy supply device to the second power tool housing area being provided.

Both the first and second interfaces may be designed to establish a releasable mechanical connection with the respective first and second power tool housing area. The mechanical connection may be designed in the form of a form-fitting and/or force-fitting coupling. It is possible here that the mechanical connection is designed in the form of a tongue-and-groove system or in the form of a rail system. In addition, the first and second interfaces are designed to establish a releasable electrical connection with the respective first and second power tool housing area. By means of the electrical connection, electrical energy can be conducted from the energy supply device to the first and/or second power tool housing area. Furthermore, the first and second interfaces and the energy supply device may be designed such that electrical communication signals can be transported from the first or second power tool housing area via the energy supply device to the second or first power tool housing area.

According to an advantageous embodiment of the present invention, it may be possible that the first and second interfaces are designed to releasably connect the energy supply device to the first and second power tool housing areas.

According to an advantageous embodiment of the present invention, it may be possible that the energy supply device is designed as a battery connection device with at least one battery interface for the releasable connection of the energy supply device to at least one battery.

According to an advantageous embodiment of the present invention, it may be possible that the energy supply device is designed as a network connection device with a line for the releasable connection of the power tool to a network power source.

According to an advantageous embodiment of the present invention, it may be possible that the energy supply device comprises at least one ventilation duct, the at least one ventilation duct extending essentially from an upper side to an underside of the energy supply device.

According to an advantageous embodiment of the present invention, it may be possible that the at least one ventilation duct comprises at least one fan for generating an air flow through the at least one ventilation duct.

According to a further advantageous embodiment, it may be possible that the power tool is designed such that a center of gravity of the energy supply device and a center of gravity of the tool housing are essentially at a point of intersection of a first and second plane, the first and second planes being arranged perpendicular to one another. This results in an almost optimal balance and weight distribution and improves the handling of the power tool.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures.

DETAILED DESCRIPTION

Figure 1:
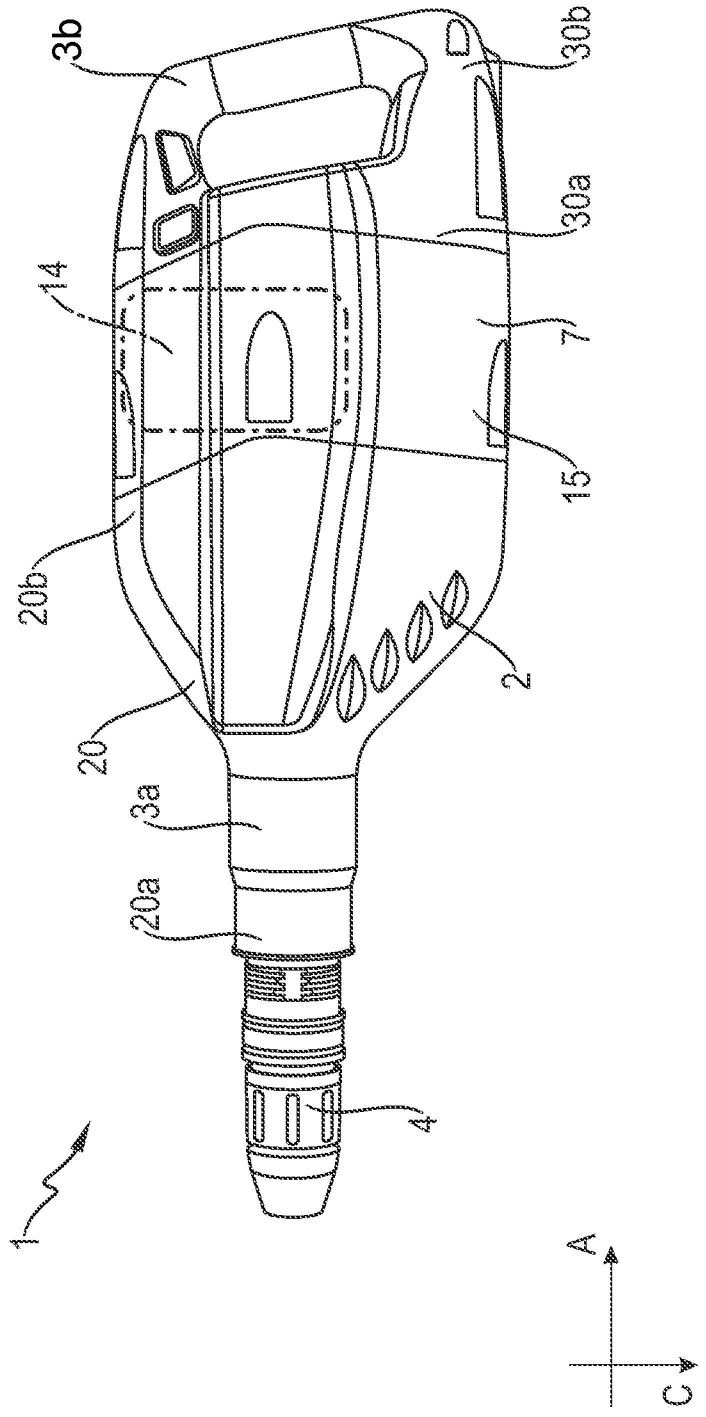
FIG. 1 shows a side view of a power tool with an energy supply device in the form of a battery connection device with an internal battery between a first and second power tool housing area.
Figure 2:
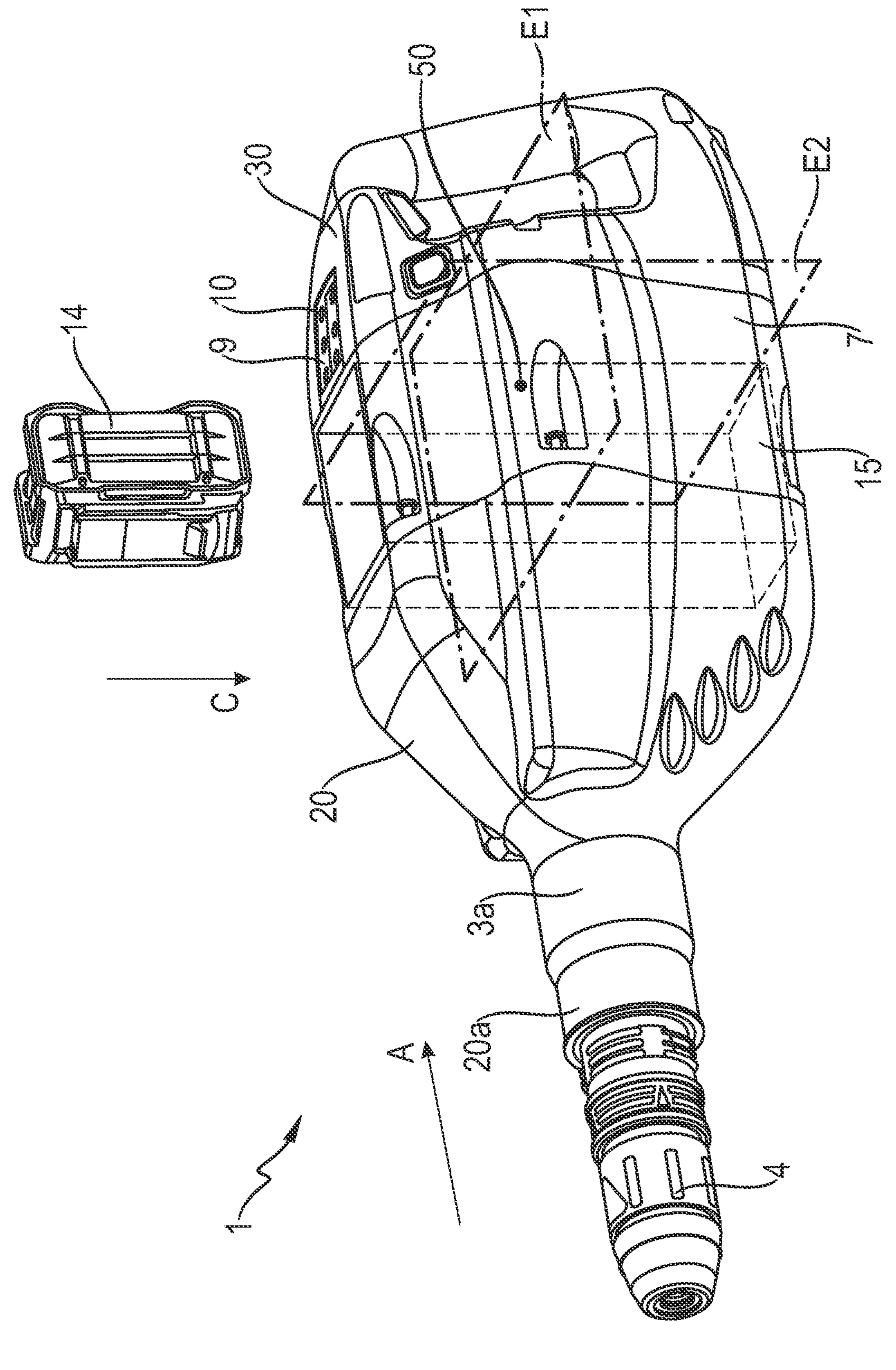
FIG. 2 shows a perspective front view of the power tool with the battery outside the energy supply device designed in the form of a battery connection device.

FIGS. 1 and 2 show a power tool 1 in the form of a chisel hammer. The power tool 1 may however also be a hammer drill, combination hammer or the like. However, it is also possible that the power tool 1 is designed in the form of a saw, a grinder, a drill, a hammer drill, a screwdriver or another hand-held power tool.

Figure 3:
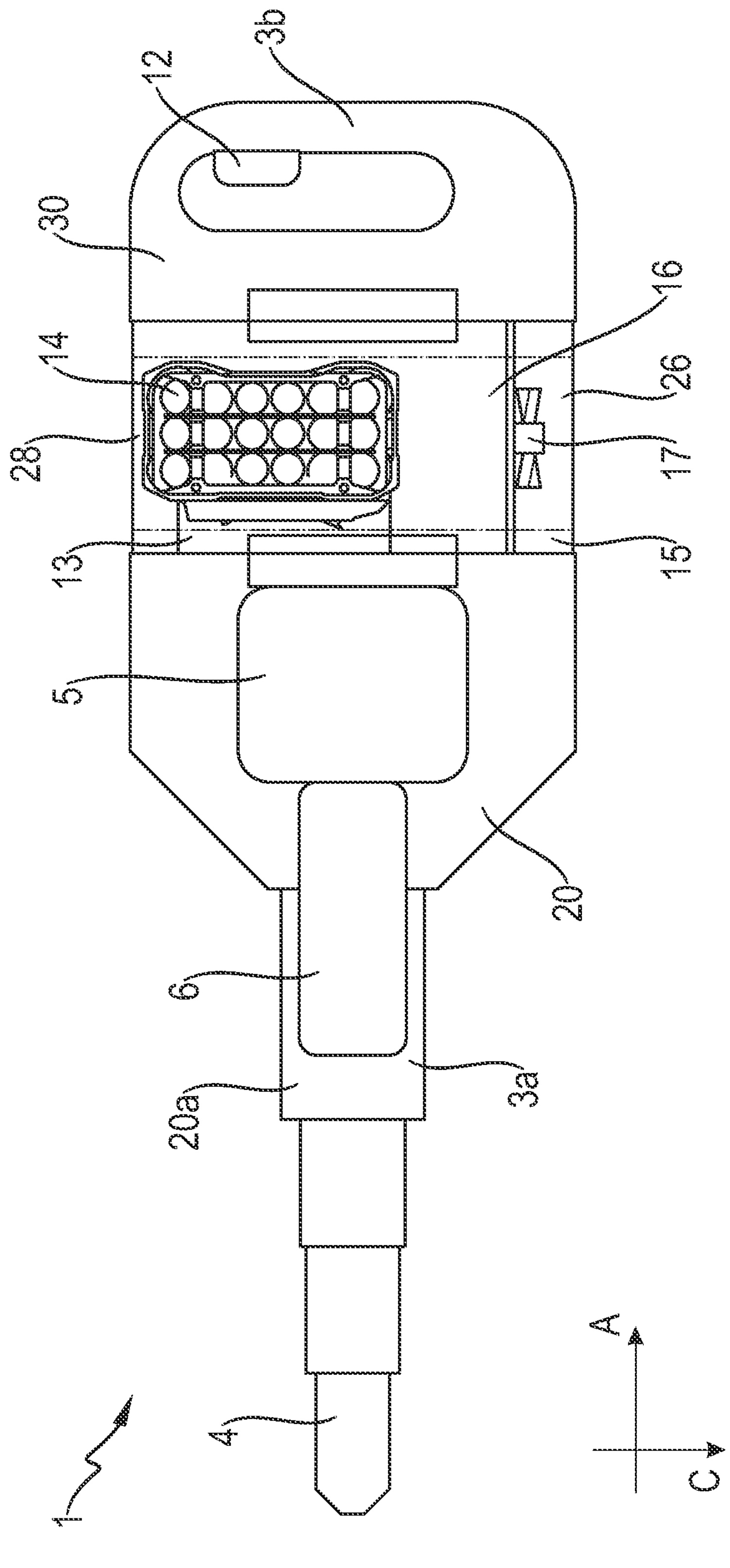
FIG. 3 shows a further side view of the power tool with the battery inside the energy supply device designed in the form of a battery connection device.
Figure 4:
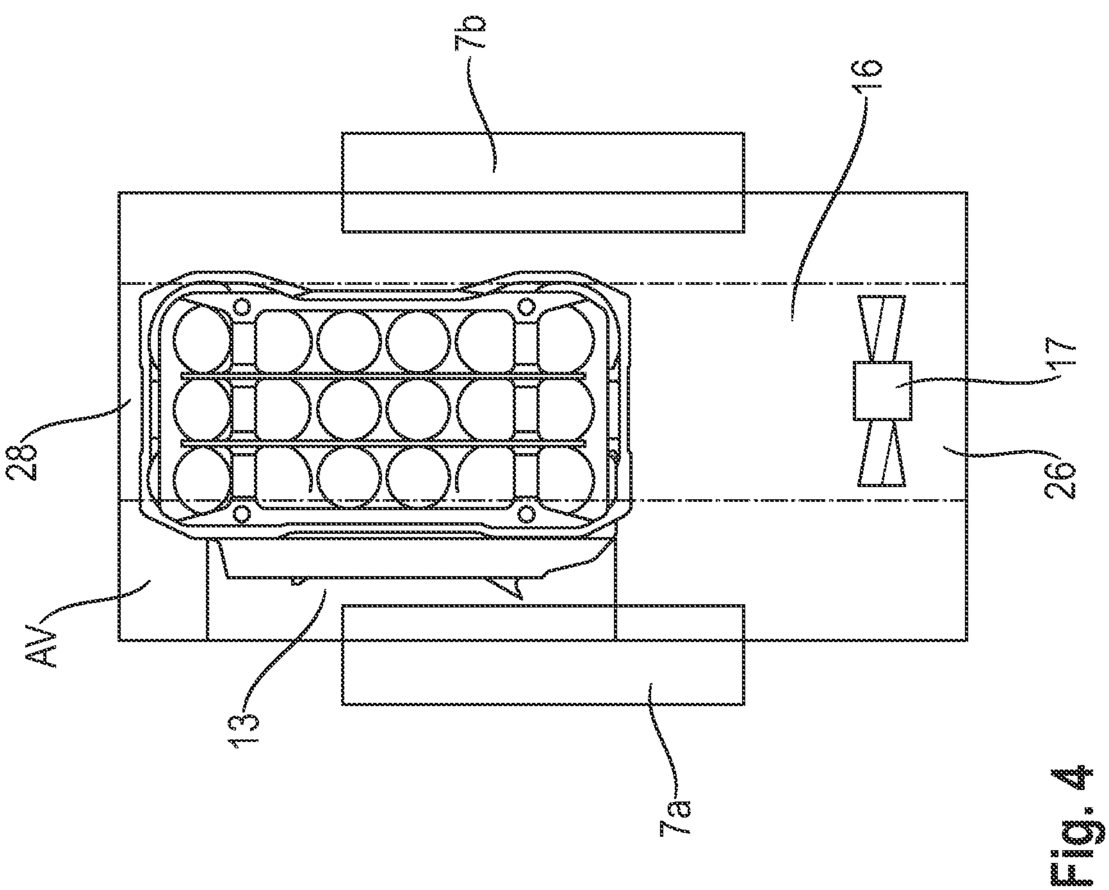
FIG. 4 shows a side view of the energy supply device designed in the form of a battery connection device with a battery positioned inside and a fan in a ventilation duct.

The power tool 1 essentially comprises a power tool housing 2, a first handle device 3*a* and a second handle device 3*b*, a tool receiving device 4, a drive 5, a striking mechanism 6, a control device and an energy supply device 7, cf. FIGS. 2 to 4.

The energy supply device 7 serves for supplying the electrical consumers with electrical energy.

The drive 5, see, e.g., FIG. 3, is designed in the form of an electric motor and serves for driving the striking mechanism 6. The striking mechanism 6 serves for generating impacts or impact pulses. The drive 5 and the striking mechanism 6 are connected to one another. The striking mechanism 6 is in turn to the tool receiving device 4 in such a way that the impact pulses generated by the striking mechanism 6 are passed on to the tool receiving device 4.

The control device is shown solely schematically as C in FIG. 1.

The power tool housing 2 comprises a first power tool housing area 20 and second power tool housing area 30. As indicated in FIG. 3, the drive 5 and the striking mechanism 6 are positioned in the first power tool housing area 20. As can be seen in particular from FIG. 2, a display device 9 and an input device 10 are provided at an upper end of the second power tool housing area 20. The display device 9 serves for displaying different states of the power tool 1. The input device 10 serves for inputting information and for setting different states of the power tool 1.

The first power tool housing area 20 in turn comprises a first end 20*a* and a second end 20*b*. The second power tool housing area 30 likewise comprises a first end 30*a* and a second end 30*b*.

The tool receiving device 4 is positioned at the first end 20*a* of the first power tool housing area 20. The tool receiving device 4 serves for receiving and holding a tool. The tool is not shown in the figures. In the case of the design of the power tool 1 in the form of a chisel hammer, the tool is designed as a chisel. In addition, the first handle device 3*a* is positioned at the first end 20*a* of the first power tool housing area 20. A first interface 22 is provided at the second end 20*b* of the first power tool housing area 20, cf. FIG. 6. The first interface 22 serves for releasably connecting the first power tool housing area 20 to the energy supply device 7. The first and second ends 20*a*, 20*b* of the first power tool housing area 20 are positioned and aligned essentially one behind the other in direction A.

Figure 6:
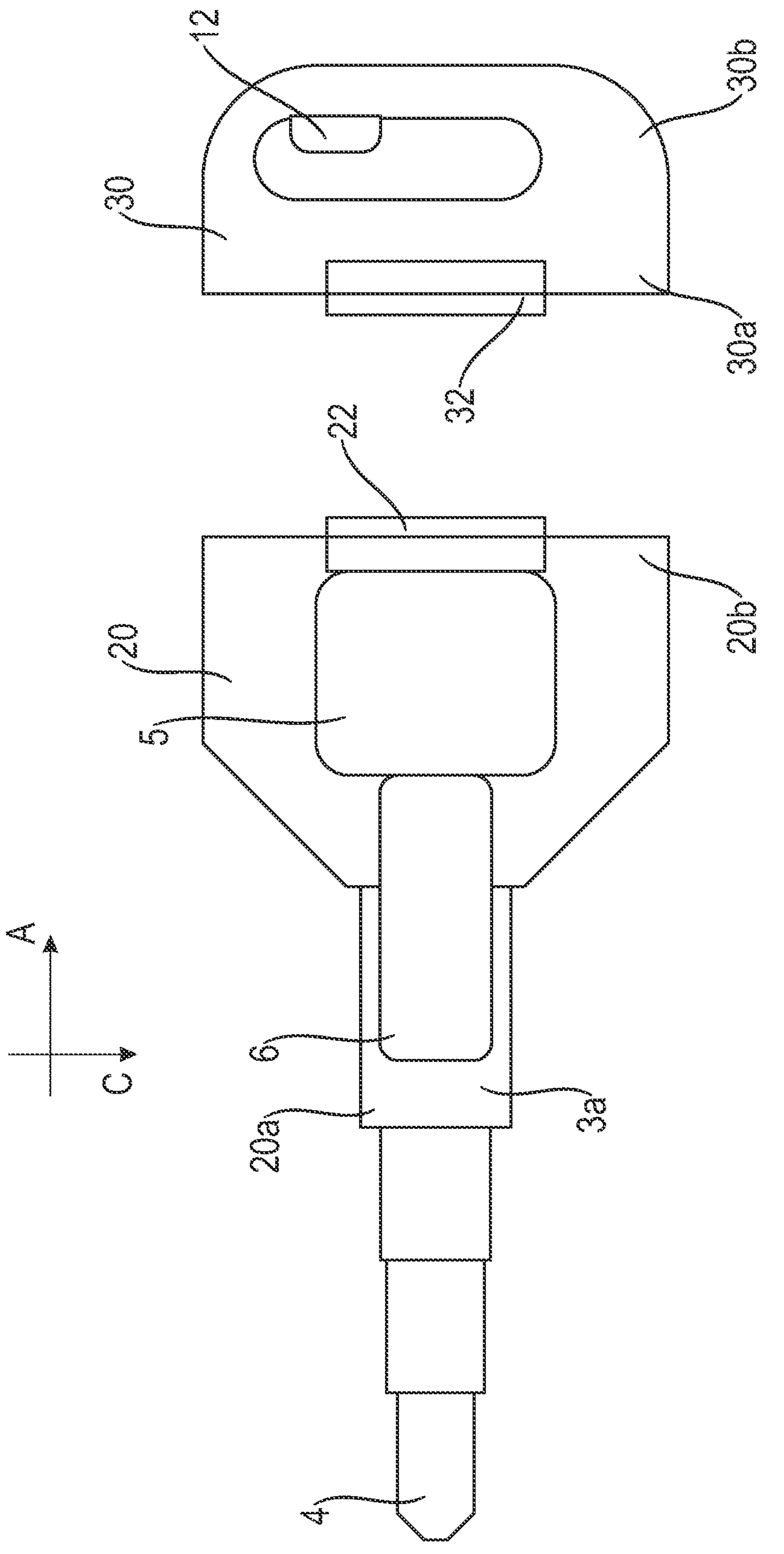
FIG. 6 shows another side view of the power tool with the first and second power tool housing areas without an energy supply device.

A second interface 32, cf. FIG. 6, is positioned at the first end 30*a* of the second power tool housing area 30. The second interface 32 serves for releasably connecting the second power tool housing area 30 to the energy supply device 7. The second handle device 3*b* is positioned at the second end 30*b* of the second power tool housing area 30. The first and second ends 30*a*, 30*b* of the second power tool housing area 30 are positioned and aligned essentially one behind the other in direction A.

Both the first and second handle devices 3*a*, 3*b* serve for holding and guiding the power tool 1. It is provided that one hand of a user of the power tool 1 firmly holds the power tool 1 on the first handle device 3*a* and another hand on the second handle device 3*b*.

As can be seen from FIG. 3, the second handle device 3*b* comprises an actuation switch 12 for actuating or activating the power tool 1. The actuation switch 12 is connected to the control device C, the energy supply device 7 and to the drive 5.

Figure 5:
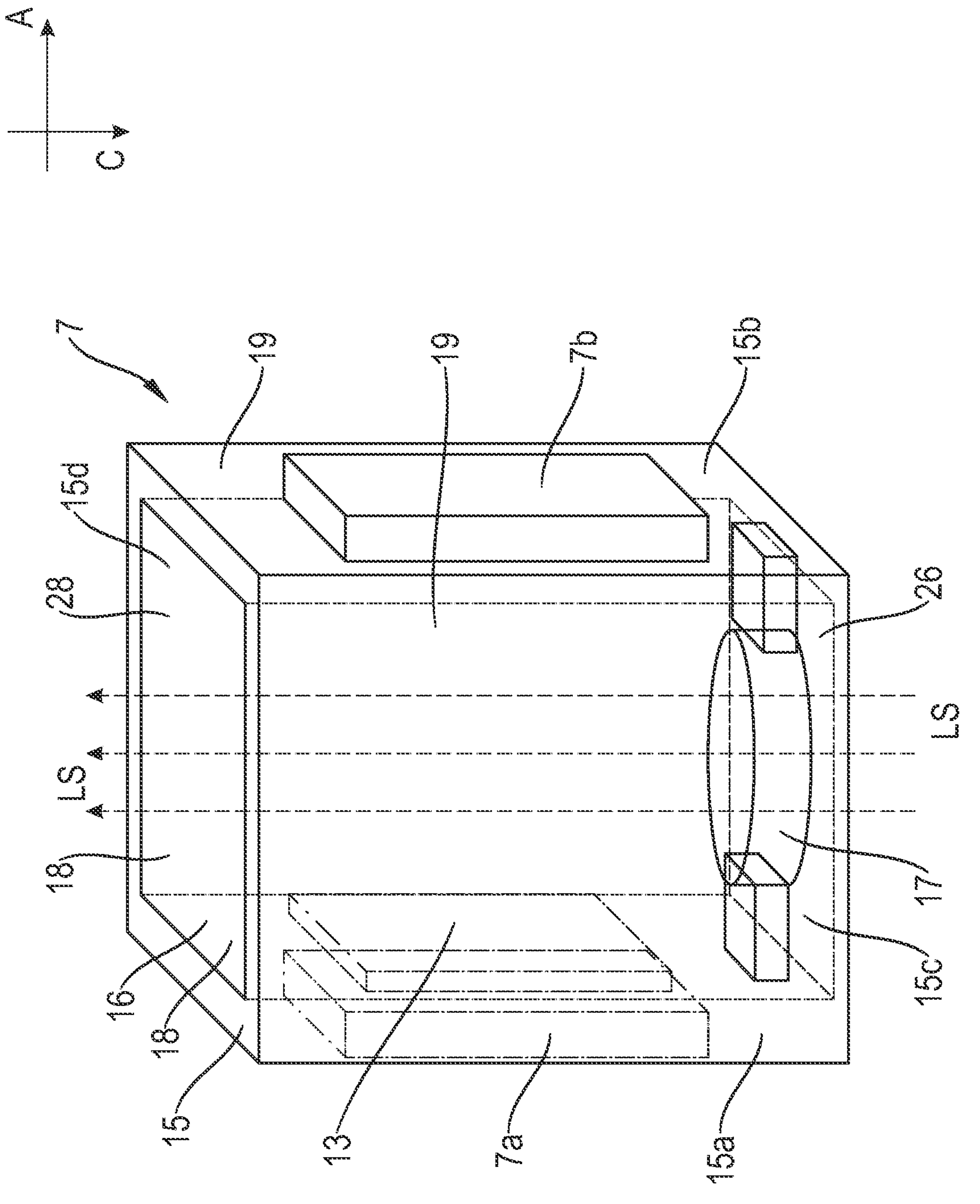
FIG. 5 shows a perspective rear view of the energy supply device designed in the form of a battery connection device without a battery.
Figure 9:
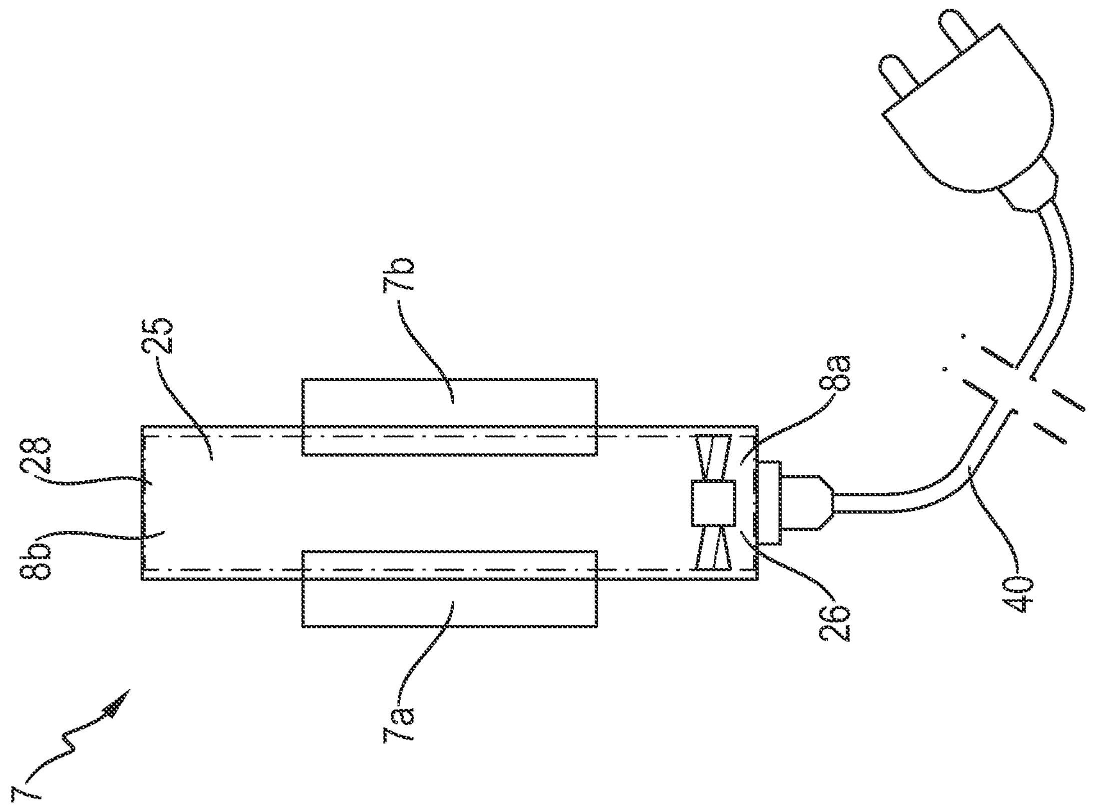
FIG. 9 shows a side view of the energy supply device in the form of a network connection device with the fan in the ventilation duct.

As can be seen in FIGS. 4, 5 and 9, the energy supply device 7 comprises a first interface 7*a* and a second interface 7*b*. By means of the first interface 7*a* of the energy supply device 7, the energy supply device 7 can be releasably connected to the first interface 22 of the first power tool housing area 20. By means of the second interface 7*b* of the energy supply device 7, the energy supply device 7 can be releasably connected to the second interface 32 of the second power tool housing area 30.

In FIGS. 1 to 5, the energy supply device 7 is shown in a first embodiment. According to a first embodiment, the energy supply device 7 is designed in the form of a battery connection device with a battery interface 13 for releasably connecting the energy supply device 7 to a battery 14. For this purpose, the energy supply device 7 comprises a basic body 15 in the form of a shaft-shaped hollow cylinder. The basic body 15 essentially comprises a first, second, third and fourth side wall 15*a*, 15*b*, 15*c*, 15*d*. The first and second side walls 15*a*, 15*b* and the third and fourth side walls 15*c*, 15*d* each lie opposite one another, so that a continuous shaft 16 in the form of a central continuous clearance with a receiving volume AV is created in the basic body 15. As indicated in FIGS. 3 to 5, a fan 17 is positioned in the shaft 16 of the basic body 15. The fan 17 serves for generating an air flow LS through the shaft 16 of the basic body 15 in order to cool the shaft 16. Each of the four side walls 15*a*, 15*b*, 15*c*, 15*d* respectively has an inner side 18 and an outer side 19. As shown in particular in FIG. 5, the first interface 7*a* is positioned on the outer side 19 of the first side wall 15*a*. Furthermore, the second interface 7*b* is positioned on the outer wall 19 of the second side wall 15*b*. Both the first and second interfaces 7*a*, 7*b* are designed to establish a releasable mechanical connection with the respective first and second power tool housing areas 20, 30. The mechanical connection may be designed in the form of a form-fitting and/or force-fitting coupling.

In addition, both the first and second interfaces 7*a*, 7*b* of the energy supply device 7 and the first interface 22 of the first power tool housing area 20 and the second interface 32 of the second power tool housing area 30 respectively comprise electrical contact elements, so that electrical energy can pass from the energy supply device 7 to the first and/or second power tool housing area 20, 30. The electrical contact elements are not shown in the figures.

Furthermore, both the first and second interfaces 7*a*, 7*b* of the energy supply device 7 and the first interface 22 of the first power tool housing area 20 and the second interface 32 of the second power tool housing area 30 respectively comprise communication elements to transport communication signals from the first or second power tool housing area 20, 30 via the energy supply device 7 to the second or first power tool housing area 20, 30. Communication signals may also be sent and/or received from the energy supply device 7 to the first and/or second power tool housing area 20, 30.

The battery interface 13 is positioned on the inner side 18 of the first side wall 15*a* of the energy supply device 7. The fan 17 is arranged below the battery interface 13 in direction C, cf. FIG. 5. By means of the fan 17, an air flow LS generated by the fan 17 can cool a battery 14 connected to the battery interface 13. By means of the battery interface 13, an battery 14 can be releasably connected to the energy supply device 7 in such a way that the electrical energy stored in the battery 14 can be transported from the battery 14 to the energy supply device 7. The battery interface 13 is designed such that the battery 14 can be pushed onto the battery interface 13 in direction C in order to create a releasable connection. The battery interface 13 and an upper side of the battery 14 have for this purpose a tongue-and-groove system.

Figure 7:
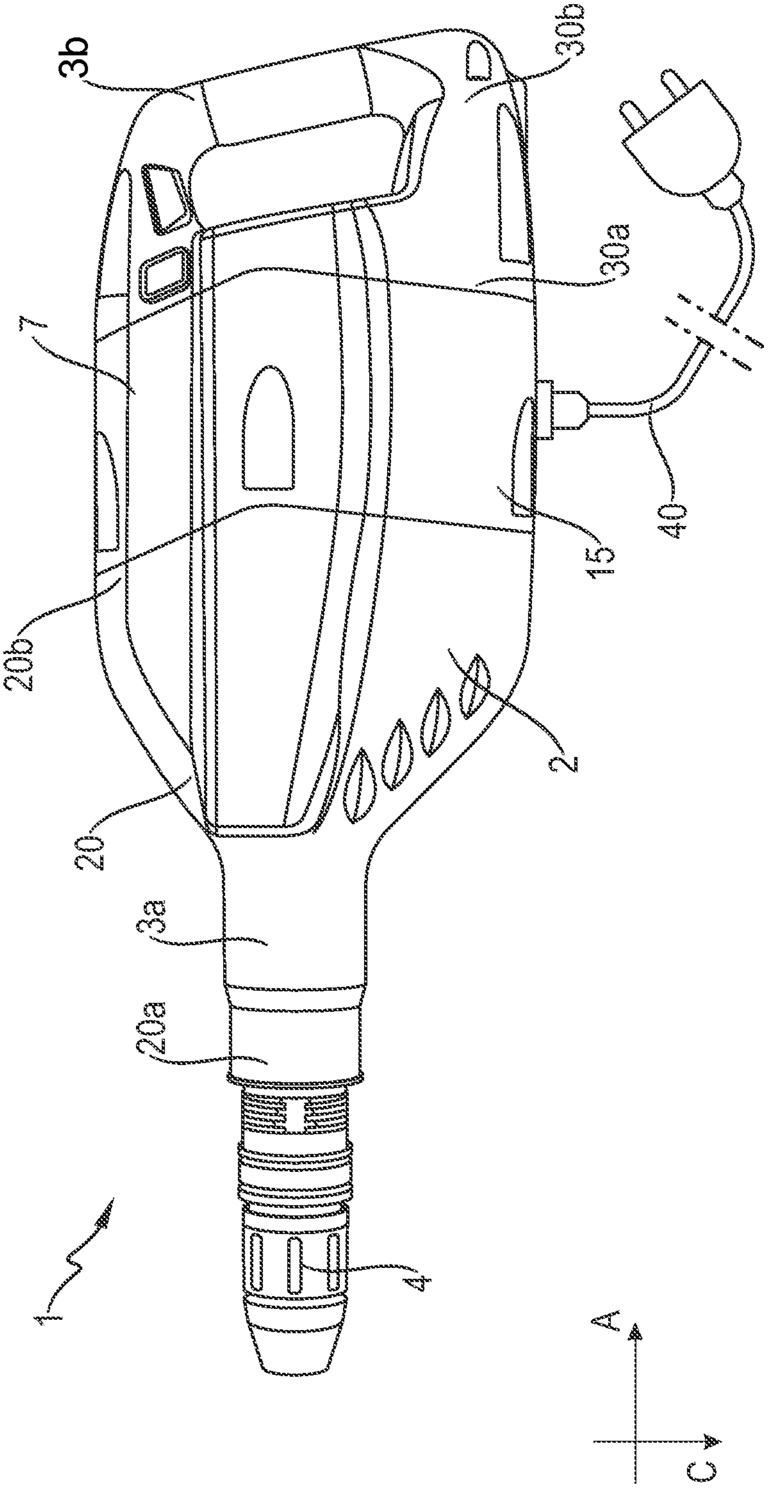
FIG. 7 shows a side view of the power tool with the energy supply device in the form of a network connection device between the first and second power tool housing areas.
Figure 8:
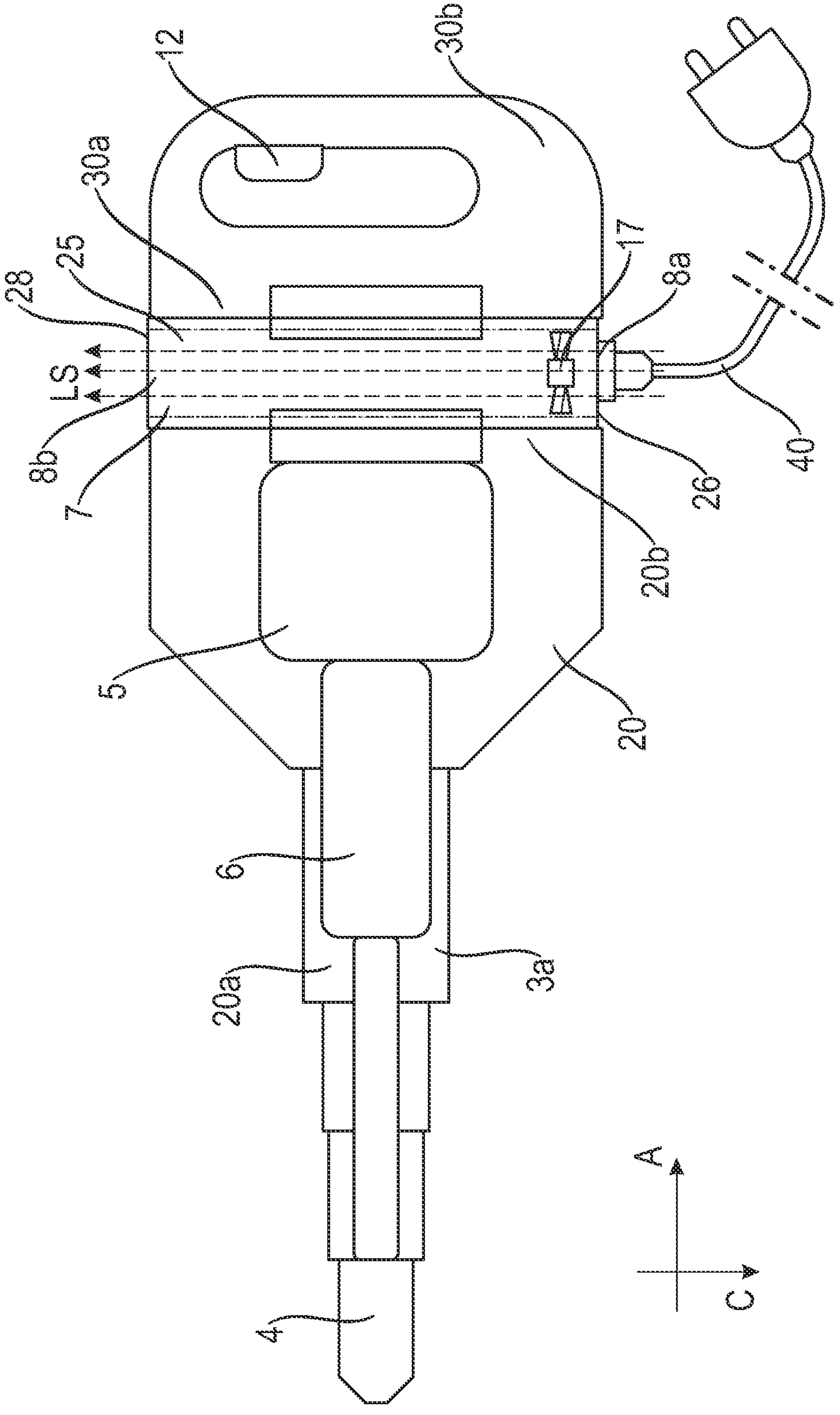
FIG. 8 shows a further side view of the power tool with the energy supply device in the form of a network connection device with a fan in a ventilation duct.

In FIGS. 7 to 9, the energy supply device 7 is shown in a second embodiment. According to a second embodiment, the energy supply device 7 is designed in the form of a network connection device. The energy supply device 7 designed as a network connection device comprises a control unit, a transformer and a line 40 for the releasable connection of the power tool 1 to a network power source.

Neither the network power source, the control unit nor the transformer are shown in the figures.

By means of the line 40, electrical energy can reach the energy supply device 7. As already described above, the electrical energy can then be transported via the first and second interfaces 7*a*, 7*b* from the energy supply device 7 to the first and/or second power tool housing area 20, 30.

As indicated in FIGS. 8 and 9, the energy supply device 7 comprises a ventilation duct 25, which extends over the entire length of the energy supply device 7 from a first opening 26 on an underside 8*a* to a second opening 28 on an upper side 8*b*. The fan 17 is positioned in the ventilation duct 25 such that an air flow LS can flow through the ventilation duct 25 in order to cool the energy supply device 7.

As can be seen from FIGS. 3 and 6, the energy supply device 7 serves for connecting the two power tool housing areas 20, 30 to one another. When the energy supply device 7 has been removed, as can be seen in FIG. 6, the first and second power tool housing areas 20, 30 are separated from one another.

As shown in FIG. 2, the power tool 1, and in particular the two power tool housing areas 20, 30 as well as the energy supply device 7, is designed such that a center of gravity of the energy supply device 7 and a center of gravity of the tool housing 1 essentially lie at a single point of intersection 50 of a first and second plane E1, E2, the first and second planes E1, E2 being arranged perpendicular to one another.

LIST OF REFERENCE SIGNS

1 Power tool
2 Power tool housing
3*a* First handle device
3*b* Second handle device 3*b*
4 Tool receiving device
5 Drive
6 Striking mechanism
7 Energy supply device
8*a* Underside of the ventilation duct
8*b* Upper side of the ventilation duct
9 Display device
10 Input device
12 Actuation switch
13 Battery interface
14 Battery
15 Basic body
15*a* First side wall
15*b* Second side wall
15*c* Third side wall
15*d* Fourth side wall
16 Shaft
17 Fan
18 Inner side
19 Outer wall
20 First power tool housing area
20*a* First end of the first power tool housing area
20*b* Second end of the first power tool housing area
22 First interface at the first power tool housing area
25 Ventilation duct
26 First opening of the ventilation duct
28 Second opening of the ventilation duct
30 Second power tool housing area
30*a* First end of the second power tool housing area
30*b* Second end of the second power tool housing area
32 Second interface at the second power tool housing area
40 Line
50 Point of intersection
LS Air flow
E1 First plane
E2 Second plane
C Control device

What is claimed is:

1. A power tool comprising:
a drive;
a striker;
a controller;
an energy supply device for supplying the power tool with electrical energy;
a power tool housing with a first power tool housing area and a second power tool housing area, the energy supply device positionable in one direction between the first and second power tool housing areas; and
a first interface for connecting the energy supply device to the first power tool housing area and a second interface for connecting the energy supply device to the second power tool housing area;
the energy supply device being a single source of energy connecting both the first and second interfaces simultaneously to connect the first and second power tool housing areas.

2. The power tool as recited in claim 1 wherein the first and second interfaces are designed to releasably connect the energy supply device to the first and second power tool housing areas.

3. The power tool as recited in claim 1 wherein the energy supply includes a battery connection with at least one battery interface for the releasable connection of the energy supply device to at least one battery.

4. The power tool as recited in claim 1 wherein the energy supply device includes a network connection device with a line for releasable connection of the power tool to a network power source.

5. The power tool as recited in claim 1 wherein the energy supply device includes at least one ventilation duct, the at least one ventilation duct extending from an upper side to an underside of the energy supply device.

6. The power tool as recited in claim 5 wherein the at least one ventilation duct includes at least one fan for generating an air flow through the at least one ventilation duct.

7. A chisel hammer comprising the power tool as recited in claim 1.

8. The power tool as recited in claim 1 wherein the energy supply device is a battery connection device with a battery interface for releasably connecting the energy supply device to a battery.

9. The power tool as recited in claim 8 wherein the energy supply device has a basic body in the form of a shaft-shaped hollow cylinder.

10. The power tool as recited in claim 9 wherein the basic body has first, second, third and fourth side walls to form of a central continuous clearance with a receiving volume in the basic body.

11. The power tool as recited in claim 10 wherein energy supply device has a further first interface positioned on an outer side of the first side wall and a further second interface positioned on an outer wall of the second side wall.

12. The power tool as recited in claim 1 wherein the further first and second interfaces establish a releasable mechanical connection with the respective first and second power tool housing areas.

13. The power tool as recited in claim 1 wherein the energy supply device has a further first interface and a further second interface for releasable connection to the first interface and second interfaces, respectively.

14. The power tool as recited in claim 1 wherein the energy supply device connects the first and second power tool housing areas to one another and is a sole structure separating the first and second power tool housing areas so that without the energy supply device the first and second power tool housing areas would not be connected.

15. The power tool as recited in claim 1 further comprising:

a first handle;

a second handle; and a tool receiver.

16. The power tool as recited in claim 15 wherein the first power tool housing area includes a first and a second end; and wherein the second power tool housing area includes a first and a second end, the tool receiver positioned at the first end of the first power tool housing area.

17. The power tool as recited in claim 16 wherein the second handle device is positioned at the second end of the second power tool housing.

18. The power tool as recited in claim 15 wherein the second handle device comprises an actuation switch for actuating or activating the power tool.

19. The power tool as recited in claim 18 wherein the actuation switch is connected to the control device, the energy supply device and to the drive.

20. A power tool comprising:

a drive;

a striker;

a controller;

an energy supply device for supplying the power tool with electrical energy;

a power tool housing with a first power tool housing area and a second power tool housing area, the energy supply device positionable in one direction between the first and second power tool housing areas; and a first interface for connecting the energy supply device to the first power tool housing area and a second interface for connecting the energy supply device to the second power tool housing area;

wherein the energy supply device connects the first and second power tool housing areas to one another and is a sole structure separating the first and second power tool housing areas so that without the energy supply device the first and second power tool housing areas would not be connected.

* * * * *